United States Patent Office 2,694,147
Patented Nov. 9, 1954

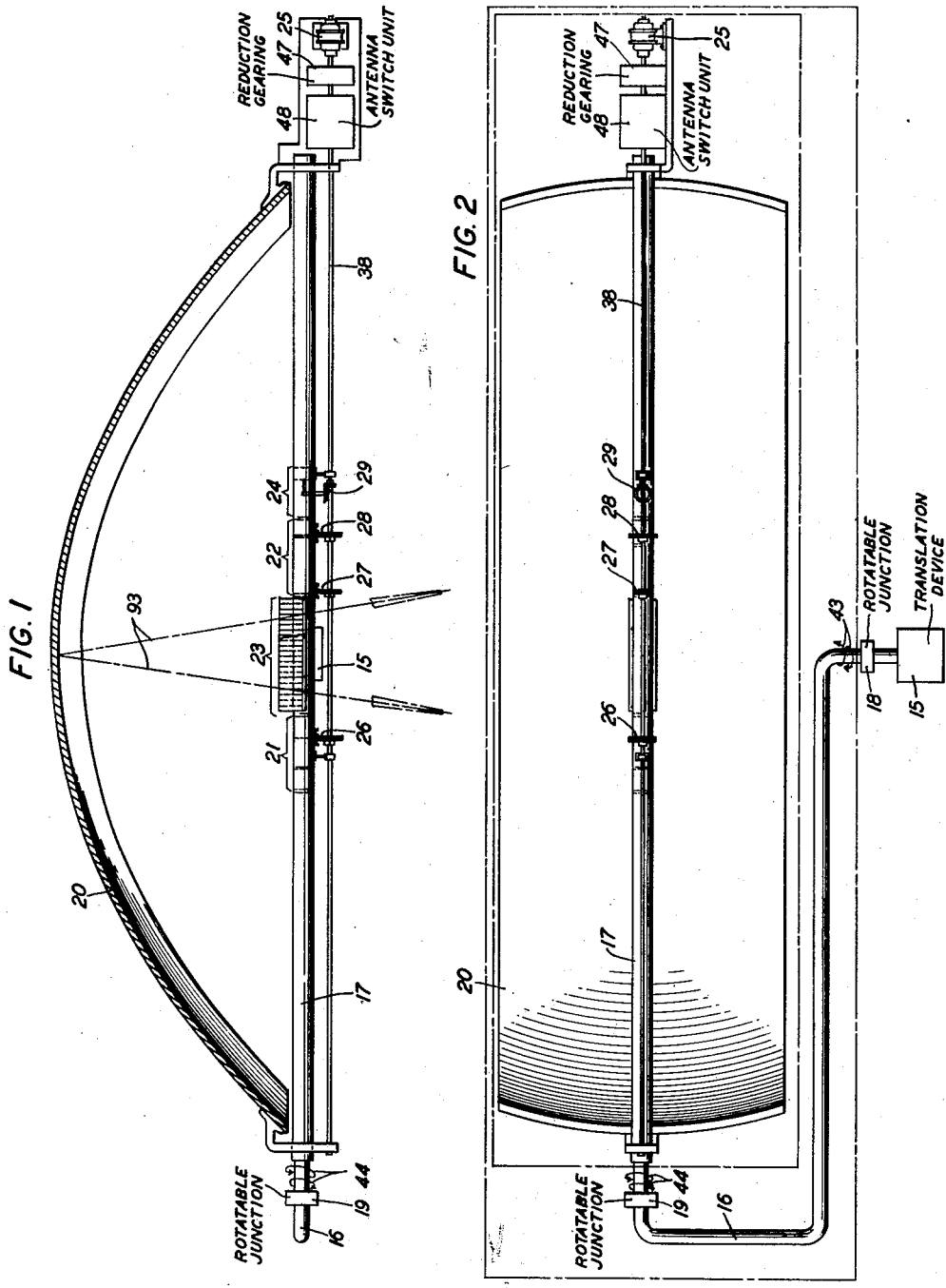

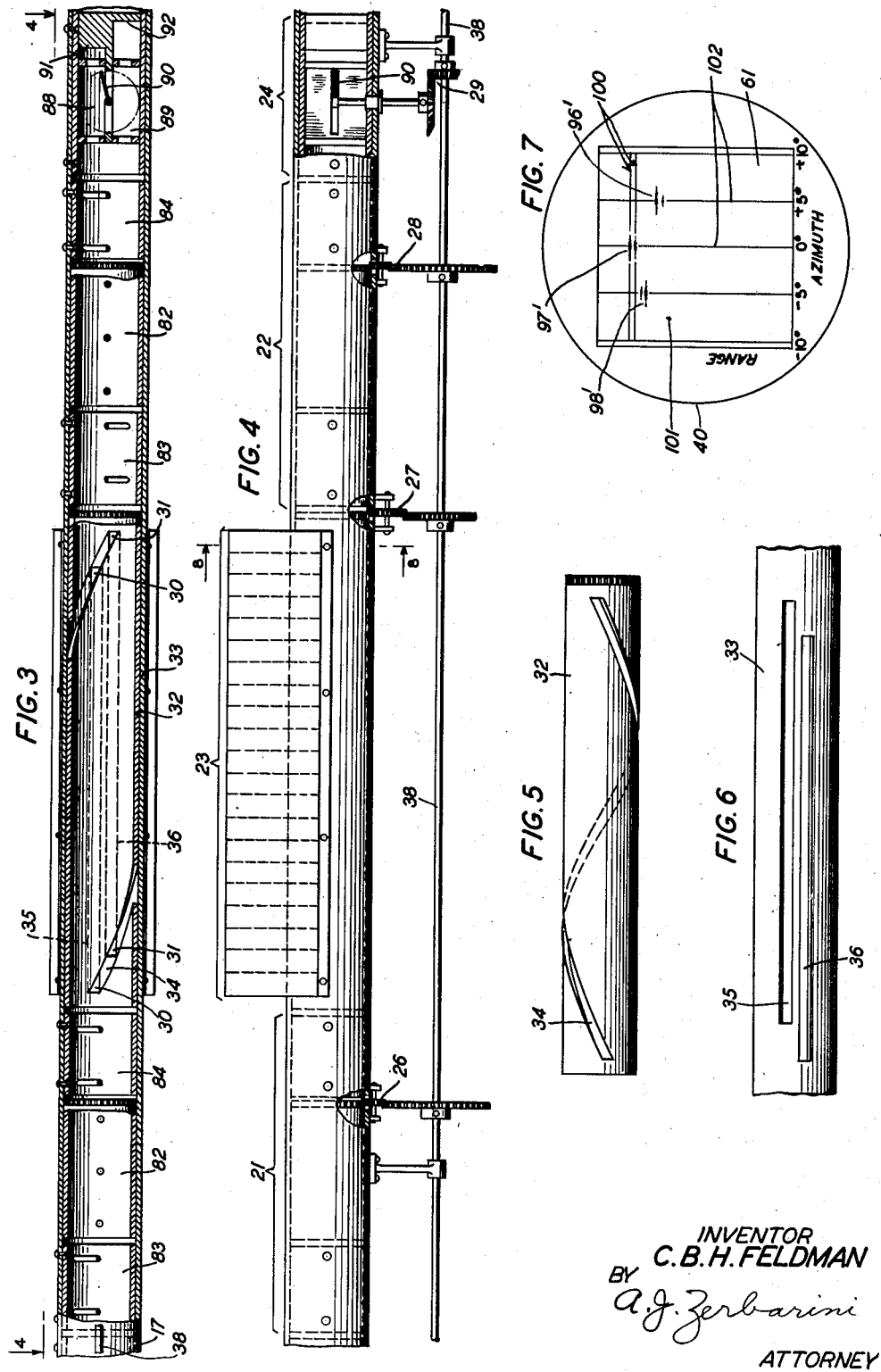

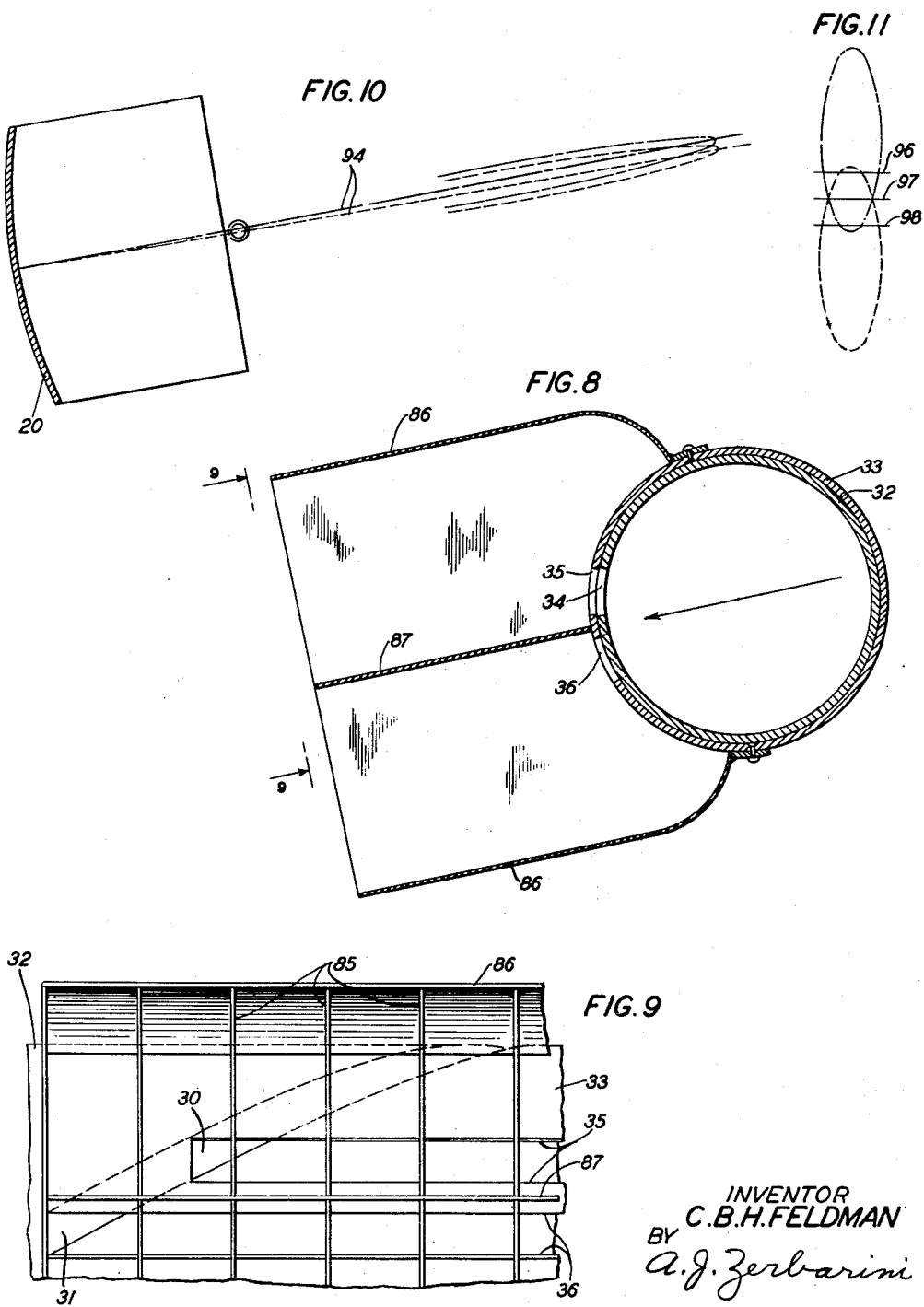

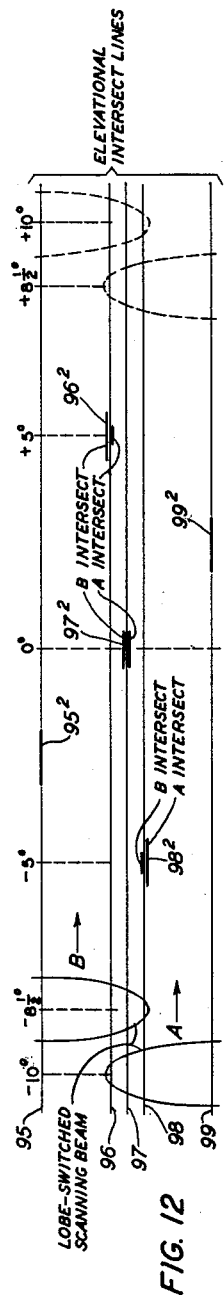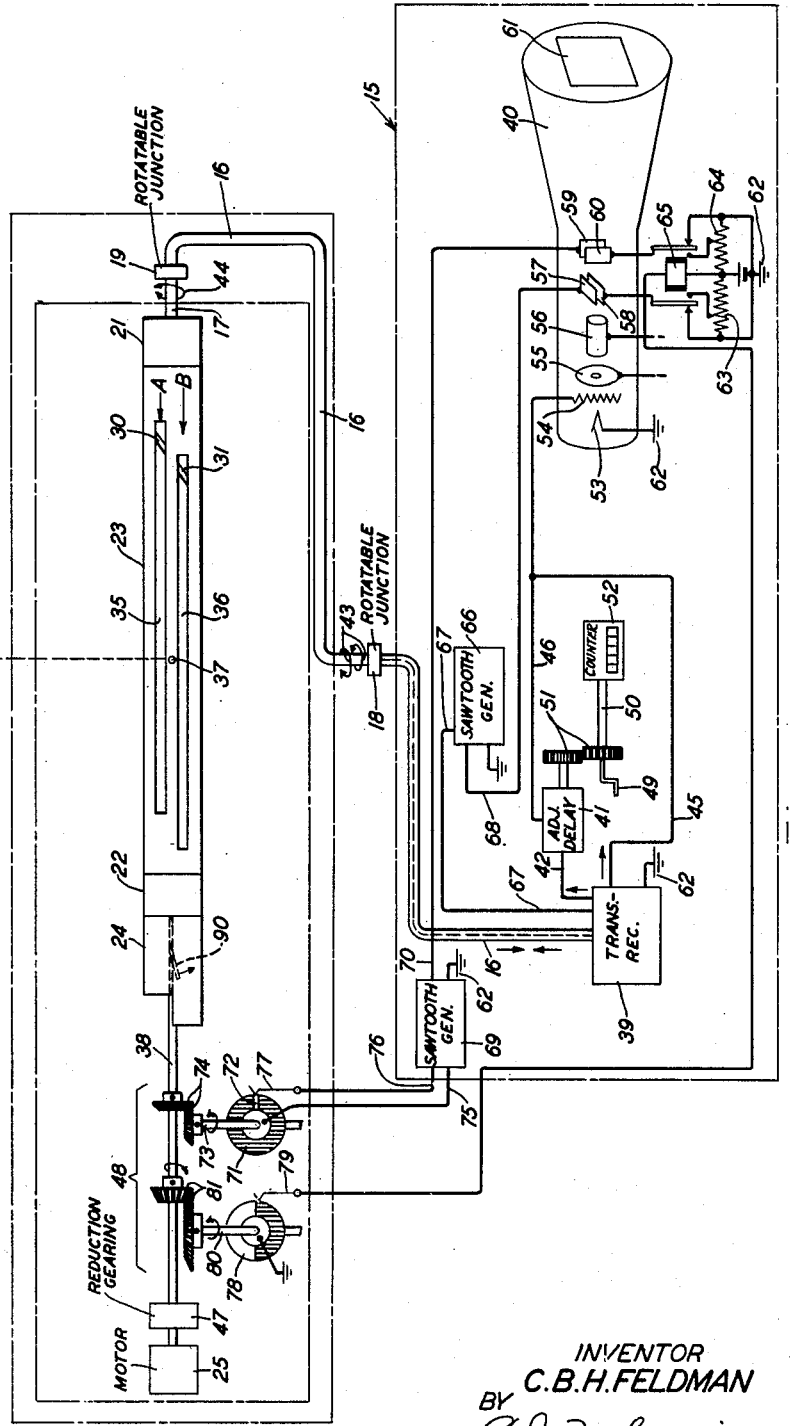

2,694,147

SCANNING ANTENNA SYSTEM

Carl B. H. Feldman, Summit, N. J., assignor to Bell Telephone Laboratories, Incorporated, New York, N. Y., a corporation of New York Application August 21, 1946, Serial No. 692,101

7 Claims. (Cl. 250—33.63)

This invention relates to antennas for a radar system, and particularly to antennas for a system adapted for the acquisition and presentation upon a single oscilloscope screen of complete positional data as to bearing, elevation and range of objects in the area scanned.

More particularly, the object of the invention is to provide antenna systems for a radar data acquisition and presentation system employing an antenna system adapted to scan in one of the two dimensions of azimuth and elevation and lobe switch in the other dimension, and in which the reflected energy from a target in the scanned area produces two indications on an oscilloscope screen, the relative brightness and dimensional magnitude of which indications indicate and provide means for determining the position of the target in one of the two dimensions of azimuth and elevation, and the location of which indications on the oscilloscope screen provides information from which the range and the position of the object in the other dimension of azimuth and elevation may be ascertained.

In accordance with the present invention the directive pattern of the scanning beam is caused to be moved repeatedly over a given scanning sector in one plane and is repeatedly lobe-switched or shifted in position in the other plane. In the particular embodiment of the invention herein disclosed the repeated scanning movements of the antenna-directed lobe or beam are in azimuth and the lobe switching of the beam is in elevation, the shifting of the beam in elevation being by an amount that causes the position of the beam in one of its shifted positions in elevation to overlap the beam in its other shifted position. Thus, for any object having a fixed direction in elevation the wave transmitted to and received from that object may, by moving the angle of the axis of the antenna in elevation, be caused to lie exclusively in one position or the other of the lobe-switched beam, or in the overlapping portion where pulsed waves are transmitted to and received from the object in both beam positions. The number of pulses transmitted to and reflected from any object in each of the shifted positions of the beam as it scans in azimuth depends upon the effective cross-sectional area of the beam along the line of its intersection with the object, and the energy of each reflected pulse depends upon the relation of the object to the linear center of the line of intersection of the beam with the object. When the lengths of the lines of intersection of the two beams are equal, that is, when the object lies on the axis of the antenna, the number of pulses transmitted to the object and the number reflected from the object over the two beams are equal, and the energies of corresponding reflected pulses over the two beams are the same. For any other position of the object with respect to the elevation axis of the antenna the number and energies of pulses transmitted and reflected are unequal.

The energy of these reflected pulses is communicated to the oscilloscope, and each pulse produces a point of light on the oscilloscope screen the brightness of which is proportional to the energy of the pulse. The series of pulses produces a line of light on the screen the length of which is proportional to the number of pulses in the series, and the brightness of which diminishes from the center of the line to its two ends. The lobe-switching shift of the antenna beam produces another luminous line on the screen parallel and close to the first line, the length and brightness of the second line also depending upon the number and energy of pulses in the series that produces it. As the number of pulses and the energy of each pulse in each case is a function of the effective cross-sectional area of the beam along the line of its intersection with the object, equality of length and equality of brightness of the two lines indicate equality of intersection with the two beams, and therefore, as this equality exists only when the object lies on the axis of the antenna, establish the position in elevation of the object.

As the position of the object in bearing, in the particular embodiment disclosed, is indicated by the azimuthal position of the antenna axis and azimuthal position on the screen of the luminous signal indication, and as the position of the object in elevation is indicated by the position of the antenna axis in elevation when the lengths and brightness of the two lines on the screen are made equal, and as the position of the object in range is indicated by the vertical position of the paired indication lines on the screen, it follows that the indication on the screen shows the position of the object in azimuth, elevation and range in the area scanned. It is of course obvious that the elevation angle of the antenna axis is not, per se, made apparent by the above-described indication on the cathode ray oscilloscope, but that when the paired lines are matched as described it is further necessary to observe the elevation angle of the antenna axis by, for example, reading a calibrated dial which turns with the antenna as its elevation angle is adjusted.

In the particular embodiment of the invention herein disclosed, the directive lobe or scanning beam is caused repeatedly, at uniform velocity and in the same direction, to sweep across the azimuthal scanning sector, and to be shifted or lobe-switched in elevation. This action is secured by causing two energy transmitting and receiving apertures to move successively, in the same direction and in the focal plane of a passive antenna or reflector, across the axis of the reflector on opposite sides of the reflector focus, and by energizing alternately these two apertures. The alternate energization of the two apertures effects the lobe-switching action, and the movement of each aperture across the reflector axis effects the azimuthal sweep of the beam.

The preferred form of radar antenna system embodying the present invention will be more fully understood by reference to the following description taken in conjunction with the drawings, in which like reference characters denote the same elements. In the drawings:

Fig. 1 is a plan view of an antenna structure including a reflector, wave guide, primary antenna and driving mechanism, the reflector being shown in section;

Fig. 2 is a front view of the structure shown in Fig. 1;

Fig. 3 is a longitudinal section of the wave guide extension, including the helically and linearly slotted members, phase shifters and tuning switch;

Fig. 4 is a plan view of the assemblage of elements shown in Fig. 3 viewed in the direction of the arrows 4—4 of Fig. 3 and showing the driving connections for the various rotatable parts;

Figs. 5 and 6 are elevation views, respectively, of the inner helically slotted and outer linearly slotted members;

Fig. 7 is a front view of the face of a cathode ray oscilloscope tube and its screen;

Fig. 8 shows a cross-section of the primary antenna member on line 8—8 of Fig. 4;

Fig. 9 is an elevation of an end portion of the primary antenna member viewed in the direction of the arrows 9—9 of Fig. 8;

Fig. 10 shows a vertical cross-section of the reflector and primary antenna indicating the lobe switching deflection of the scanning beam;

Fig. 11 is a cross-sectional schematic illustration of the general contour of the scanning beam and the nature of the overlap or intersection that occurs in the two lobe-switching positions of the beam; and Fig. 12 is a functional schematic diagram showing the operative relationships of the transmitting and receiving elements of a preferred system employing the present invention.

Referring now to the preferred embodiment of the invention illustrated in the drawings, reference numeral 15 indicates a translation device such as an ultra-high frequency or centimetric wave transmitter and receiver, or a radar transceiver, and reference numeral 16 indicates a wave guide or transmission line extending to the wave guide extension 17 forming part of the antenna structure. The main wave guide 16 is provided with rotatable junctions 18 and 19 so constructed as to permit the antenna to be turned in suitably arranged mountings either in a horizontal or a vertical plane or both, without altering the alignment of an electrically polarized wave. The presence of means for rotating the antenna assembly in azimuth or in elevation is indicated by the circular oppositely directed arrows 43 associated with rotatable junction 18 and the similarly oppositely directed arrows 44 associated with rotatable junction 19.

The portions of the antenna structure which cooperate in the transmission and reception of the ultra-high frequency waves include, referring particularly to Figs. 1 and 2, the parabolic or paraboloidal reflector 20, the phase shifters 21 and 22, the primary antenna 23 and the tuning switch 24, the phase shifters, primary antenna and tuning switch being rotated by the motor 25 through the medium of the reduction gearing 47 and the gears 26, 27, 28 and 29; also an antenna switch unit 48 is operated by the driving shaft 38 for a purpose that will hereinafter be explained.

The wave guide extension 17 extends diametrically across and along the latus rectum of the paraboloid reflector 20 and is supported at its ends by suitable brackets. Functionally, the wave guide extension 17 terminates at the right-hand end of the tuning switch 24. As the parts are represented in the drawings, the tubular portion of the extension that extends from this point to the right-hand supporting bracket serves merely a supporting function. It will be understood that structurally the showing of the various supporting elements of the antenna assembly is merely schematic, terminating and strengthening flanges along the sections of the outer tube of the wave guide extension where the operating elements are carried, and the customary ball bearings to facilitate rotation of the rotatable parts being omitted for the sake of simplicity in the disclosure of the essential elements of the antenna system, as are also the structural parts whereby the antenna system is rotated in azimuth and elevation.

The waves with which the antenna system of the present invention is designed to operate are pulsed centimetric waves of the $H_1$ type; that is, they are waves of such high frequency as to have a wavelength of only a few centimeters in space, and are waves having a linear electrical polarization transverse to the direction of propagation. In transmission these waves pass from the translation device 15 to one or the other of two apertures in the primary antenna 23, from which they are radiated and reflected to form the directive scanning beam or lobe. In reception the echo waves from the objects scanned are directly received by way of the reflector and one or the other of the two apertures in primary antenna 23, and pass by way of the wave guide to the translation device 15. Each centimetric wave pulse may, for example, be a fraction of a microsecond long, and the pulses may succeed each other at the rate of 1,800 per second.

The transmitting and receiving primary antenna apertures referred to above are designated 30 and 31 in the drawings. They are formed by the intersection of a helical slot 34 in a member 32 with the two parallel linear slots 35 and 36 formed in the member 33. In the embodiment of the invention disclosed the helically slotted member 32 forms a continuation of the wave guide extension 17 and is rotatable within the linearly slotted member 33, which member is fixed and forms a continuation of the outer shell or tube of the wave guide extension. The two linear slots 35 and 36 are of equal length, this length being equal to an even number of half wavelengths in the guide. The two linear slots are overlapped with respect to each other to a degree determined by the pitch of the intersecting helical slot 34 and the circumferential angular displacement of the two linear slots in the member 33. The axial length of the helical slot 34 is such that at one point in the rotation of the member 32 the helical slot 34, as shown in Fig. 3, symmetrically intersects at each of its ends the two linear slots in the member 33. At this particular point in the rotation of member 32 there are four areas of intersection between the helical slot and the two linear slots, and therefore four apertures 30, 31, through which wave energy may be transmitted or received. As this point in the rotation of helically slotted member 32 is passed, the axial traverse of the helical slot along the two linear slots is such as to form only two points of intersection, and therefore two apertures, one for each linear slot, and this relationship continues until, in the continued rotation of member 32, the point is again reached where the two apertures start to open at one end of the linear slots while the two apertures that have traversed the two linear slots are closing at the other end. The relationship between the helical slot and the two linear slots is such that at all times the area of opening between wave guide and exterior remains constant. Thus the effect in the continuous rotation of the helically slotted member 32 is such that there is a continuous axial movement of two apertures always in the same direction from one end of the primary antenna member 23 to the other end, the apertures reappearing at the originating end as they are closing at the terminating end.

The pitch of the helical slot 34 and the circumferential separation of the two parallel linear slots 35 and 36 are preferably so chosen that the separation between the two apertures axially along the primary antenna member 23 is equal to one-quarter wavelength in the guide. This, as will subsequently be explained, is so that when the aperture formed by the intersection of the helical slot and one of the linear slots is centered upon an energy loop of the standing wave pattern that is caused to move along the primary antenna member 23 at the same rate at which the apertures move, the aperture formed by the intersection of the helical slot and the other linear slot is at the same time centered upon a node or null of the standing wave pattern.

In the present illustrative embodiment of the invention it is assumed that the frequency employed is such as to give a wavelength of 9.82 centimeters or 3.87 inches in free space. The corresponding wavelength in the guide is 15.8 centimeters or 6.22 inches. It is further assumed that the linear traverse of each of the apertures is equal to three wavelengths or 18.66 inches in the guide. With the elements of the structure disposed along the latus rectum of the parabolic reflector in such a way that each of the primary antenna apertures 30 and 31 passes the reflector focus at approximately the mid-point of its traverse, it has been ascertained by trial that the scanning movement of the directive lobe of the scanning beam is approximately one degree per inch of aperture movement, or a total scanning movement of about 18½ degrees. The above is based upon the assumption of a principal focal length for the parabolic reflector of 49 inches.

As is well known, the angular dimensions or cross-sectional contour of the directive lobe at the half-power point is a function of the dimensions of the reflector and the wavelength in air of the radiated energy. Assuming that in the present illustrative embodiment the breadth of the paraboloidal reflector 20 is 15 feet and its height 5 feet, the directive lobe of the scanning beam at its half-power point is approximately 1⅓ degrees in breadth and 4 degrees in height. The reflector and wavelength values may be varied to give a directive lobe of the angular dimensions and contour desired.

Further with respect to the illustrative embodiment of the invention herein disclosed, the internal diameter of the wave guide actually used is 2⅞ inches, giving an internal circumference of approximately 9 inches. As it is assumed that one complete revolution of the helically sloted member 32 produces an axial or longitudinal movement of each aperture equal to three wavelengths in the guide, a 120-degree or one-third rotation is required to move the aperture axially one wavelength, and one-quarter of this 120 degrees or 30 degrees to move the aperture one-quarter wavelength. Thirty degrees is one-twelfth of the nine-inch circumference of the wave guide, or three-quarters inch, and therefore if the parallel linear slots are three-quarters inch from center to center, their intersections with the helical slot are one-quarter wavelength apart lengthwise of the wave guide, so that when one is centered on an energy loop the other will be centered on an energy node. In the particular embodiment illustrated the width of the linear slots 35 and 36, as well as the width of the helical slot 34, is one-half inch, and their proximate edges are one-quarter inch apart. If the desired amount of angular scan of the directive lobe may be secured by a longitudinal aperture traverse of two wavelengths in the guide instead of three, then a one-quarter wavelength longitudinal separation of the two apertures may be secured by a 45-degree circumferential separation of the linear slots, that is one-eighth of nine inches, or one and one-eighth inches instead of three-quarters inch from center to center.

The electromagnetic wave energy passing through the apertures 30 and 31 in their movement along the primary antenna member 23 is transmitted to or received from the reflector 20 through wave-guiding members best illustrated in Figs. 8 and 9 of the drawing. These members consist of two longitudinally extending side walls 86 with a wall 87 midway between the two, together with a plurality of closely spaced partitions 85 lying in planes transverse to the planes of the side and center walls. These partitions are secured at their points of intersection with the walls 86 and 87 and the assemblage is mounted upon the outer concentric member 33 to form, in effect, a plurality of wave guides the outer ends of which are open and the inner ends of each series of which communicate respectively with the linear slots 35 and 36. The two series of external wave guides extend from one end to the other of the two overlapped linear slots 35 and 36.

As indicated by the arrow in Fig. 8, the centimetric waves employed have a linear electrical polarization in a plane coinciding with the horizontal plane of the longitudinal axis of the primary antenna members, and, as previously stated, the electromagnetic waves in this particular embodiment of the invention have a wavelength of 3.87 inches in air or free space. The external wave guide assemblage comprising the walls and partitions 85, 86 and 87 is so proportioned that each unitary section bounded by two partitions and two walls has a dimension between walls of something greater than one-half wavelength and a dimension between partitions of something less than one-half wavelength. These dimensions are such, as is well understood in the art, as to permit the free passage of the electromagnetic energy of waves electrically polarized in the plane of the short dimension of the unitary section, and to prevent passage of waves polarized in the plane of the long dimension of the unitary section. Therefore waves that may result from energy leakage between the two concentric members 32 and 33 of the primary antenna, which waves have a vertical transverse electrical polarization, are prevented from escaping through the external wave guide assemblage, while the useful energy radiation consisting of waves electrically polarized in a horizontal plane are permitted to pass freely.

The manner in which one or the other of the pair of apertures 30 and 31 moving repeatedly in the same direction from end to end of the primary antenna member 23 are energized for the radiation and reception of wave energy will now be described. The means employed for accomplishing this includes the front phase shifter 21, the rear phase shifter 22 and the tuning switch 24. The phase shifters 21 and 22 are of the type disclosed in Patent 2,438,119 granted on March 23, 1948, to A. G. Fox, preferably modified for wide frequency band operation as disclosed in Patent 2,425,345 granted on August 8, 1947, to D. H. Ring, and the tuning switch 24 is of the type disclosed in Patent 2,396,044 to A. G. Fox, issued March 5, 1946. Referring first to the tuning switch 24, this device consists essentially of two resonant chambers 88 and 89 and a detuning pin arranged in its rotation to be alternately and successively introduced into the two chambers. Each chamber has an iris opening at each end, and is so dimensioned as to be resonant to the frequency of the wave that the system employs. The front iris opening of each resonant chamber is in communication with the wave guide, and the rear iris opening of each is in communication with an extension terminating in a reflecting wall, 91 for chamber 88, and 92 for chamber 89. The chambers 88 and 89 are separated by a common partition having a longitudinal slot therein, through which slot the detuning pin passes from one chamber to the other in its rotation. The pin 90 and the separating partition are so dimensioned that through 180 degrees of its rotation the pin is projected into one chamber and through the next 180 degrees projects into the other chamber. The particular chamber in which the pin is present is detuned and the passage of wave energy through that chamber is prevented, while at the same time the other chamber permits the free passage of energy through it.

The two end walls or reflecting walls 91 and 92 are so spaced as to lie one-quarter wavelength apart in the direction of wave energy propagation. It follows therefore that when resonant chamber 88 is detuned and resonant chamber 89 is open, the length of the transmission path for the propagated wave is one-quarter wavelength longer than when chamber 89 is detuned and chamber 88 opens. The action of the tuning switch 24 upon the operation of the system will now be described. For the present it will be assumed that the two apertures 30 and 31 of the primary antenna are stationary, their scanning movement having been arrested at a point in their traverse where the stationary or standing wave pattern produced by the interference or interaction between the "go" wave from the transceiver 15 and the "return" wave reflected from one of the end walls beyond tuning switch 24 produces an energy loop at one of the apertures and an energy node at the other aperture linearly spaced one-quarter wavelength from the first aperture. Let it be assumed that this condition is one in which the energy loop exists at aperture 30 (the one closer to transceiver 15) as a result of chamber 88 being open to cause end wall 91 to act as the reflecting wall and chamber 89 being detuned. Now when detuning pin 90 in the course of its rotation leaves chamber 89 and enters chamber 88, chamber 88 will be detuned, and chamber 89 will be opened to permit end wall 92 (the one more remote from transceiver 15) to act as the reflecting wall for the return wave. When this occurs, the loops and nodes of the standing wave pattern will immediately be reversed and therefore aperture 30 will coincide with a node and aperture 31 with a loop of the standing wave pattern. It therefore follows that during 180 degrees of the rotation of pin 90 from its mid-position in the partition separating the two resonant chambers the aperture associated with one of the linear slots 35 and 36 in member 33 of the primary antenna is operative, and during the other 180 degrees of its rotation the aperture associated with the other linear slot of member 33 is operative to radiate or receive energy.

Coming now to the matter of the phase shifters identified generally as 21 and 22 on Figs. 1 and 4 of the drawing, it is evident that in the physical movement of the primary antenna apertures 30 and 31 along their longitudinal slots the length of the electrical transmission system supplying energy to the apertures is changed. As the apertures move from left to right along the slots the electrical distance between them and the translation device or transceiver 15 increases and the electrical distance between the apertures and the reflecting walls 91 and 92 diminishes. Consequently, in the absence of means to prevent it, the movement of the apertures would be accompanied by a continual change in amplitude and phase of the wave energy radiated or received at the apertures and a resultant continual change in the electrical characteristics of the scanning lobe. It is to avoid such a result as this that the phase shifters are employed. By their use the electrical distance from apertures to transceiver and from apertures to reflecting walls is maintained constant at all times during the movement of the apertures.

Each of the two phase shifters 21 and 22 comprises a centrally rotatable section or rotor 82 and two end stationary sections 83 and 84, one of which end sections is a polarizer or circularizer for converting a wave having a fixed linear polarization to one having a circular or rotating linear polarization, and the other of which is a depolarizer or decircularizer for converting a circularly polarized wave to one having a fixed linear polarization. The identical end sections function as polarizers or depolarizers, depending upon the direction of wave propagation in the phase shifter, and therefore upon whether the antenna is transmitting or receiving high frequency pulses. Each of the rotors 82 of the phase shifters 21 and 22 may be operated to shift the phase angle of the electrical waves passing through it, each rotor shifting the phase angle 360 degrees by a 180-degree physical rotation of the rotor. Therefore in the specific exemplification of the invention employing 9.82-centimeter waves, a 180-degree rotation of rotor 82, producing a phase shift of 360 degrees equal to one wavelength or 6.22 inches in the guide, increases or diminishes the electrical length of the corresponding portion of the transmission system by 6.22 inches. The longitudinal traverse of each of the apertures 30 and 31 from one end to the other of its linear slot effected by one turn of member 32 is, as previously stated, three wavelengths in the guide or 18.66 inches. To effect a corresponding change in the electrical length of the guide on either side of the apertures therefore requires one and one-half full turns of the rotor 82 during the time the helically slotted member 32 is making one complete turn to move the apertures 30 and 31 from one end to the other of their respective linear slots.

The two rotors 82 and the helically slotted member 32 are driven continuously and at a constant velocity by the motor 25 through the medium of shaft 38 and gears 26 and 28, respectively, the gear ratios being such as to turn each of the rotors 82 one and one-half turns, while the helically slotted member 32 is being driven through the gears 27 to make one complete turn. If the phase shifters are so adjusted as to produce appropriate phase angles at the initiation of the three-wavelength movement of the apertures along their slots, they will reproduce the same appropriate phase angles for subsequent repetitions of aperture movement, because the movement is an exact multiple of the half-wavelength.

To change the virtual length of the wave guide on each side of the apertures in the right direction as to lengthening or shortening, requires the establishment of a definite relation between the direction of rotation of the phase shifter rotor sections and the particular orientation of the reactance rods of the stationary phase shifter sections 83 and 84 of phase shifters 21 and 22 with respect to the plane of electric polarization of the electromagnetic waves employed. The proper relationship of the various elements for the particular case in question is indicated in Fig. 3. Assuming the electrical plane of polarization of the waves in the guide to be perpendicular to the plane of the paper and the rotatable elements all arranged to be rotated in the same direction, the reactance rods of stationary sections 83 and 84 of phase shifter 21 are all oriented at the same angle of 45 degrees in a clockwise direction (looking into the open left-hand end of the wave guide extension) with reference to the electrical polarization plane. The reactance rods of the stationary section 83 of phase shifter 22 are oriented at 45 degrees in a counterclockwise direction with reference to the electrical plane of polarization. As to stationary section 84 of phase shifter 22, the reactance rods are so oriented as to lie in the same plane as the reactance rods of the stationary sections of phase shifter 21. The reason for this is that with the driving connection of the tuning switch applied in the more convenient manner shown in Figs. 3 and 4 the plane of rotation of the detuning pin 90 is at right angles to the plane of electrical polarization of the electromagnetic waves in the guide. By orienting the reactance rods of section 84 of phase shifter 22 as described, the plane of electrical polarization of the waves in the chambers of tuning switch 24 is oriented to coincide with the plane of rotation of the detuning pin 90, thus making the pin effective to perform its detuning operation.

Suppose that the direction of the drive of the helically slotted member 32 and of the rotors 82 with the reactance rods thus oriented is in a clockwise direction viewed from the left-hand end of the wave guide. With the elements thus arranged and with the helical slot cut as a left-hand thread, the shift of the phase angle produced by the rotors 82 of both phase shifters is such as electrically in effect to move the transceiver 15 continuously toward the receding apertures 30 and 31 and the reflecting end walls 91 and 92 of tuning switch 24 away from the apertures 30 and 31 in exact correspondence as to wavelength with the linear movement of the apertures along their slots, so as at all times to maintain the apertures at an unvarying electrical distance from the transceiver and the reflecting end walls.

In effect, the action is such as to keep one of the apertures throughout its movement aligned with a voltage loop and the other aperture aligned with a voltage node of a standing wave pattern produced by the interference of the "go" waves with the "return" waves reflected from one or the other of the end walls 91 and 92. If the chamber 89 of the tuning switch is in its detuned condition, then the return waves are reflected from end wall 91, and the aperture associated with the upper linear slot 35 is aligned with a voltage loop and the aperture associated with linear slot 36 is aligned with a voltage node throughout a complete turn of the helically slotted member 32. If, on the other hand, it is the chamber 88 of tuning switch 24 that is in its detuned condition, then the return wave is reflected from end wall 92, and it is the aperture associated with linear slot 36 that is aligned with the voltage loop and the aperture associated with linear slot 35 that is aligned with the voltage node throughout one complete turn of the helically slotted member 32. The relation of the tuning switch 24 and the helically slotted member of primary antenna 23 with driving shaft 38 is preferably such that the movement of detuning pin 90 from one resonant chamber to the other occurs at the instant that the intersecting relation of helical slot 34 with the two linear slots 35 and 36 is as shown in Fig. 3. As this condition recurs every full revolution of helically slotted member 32 and every half-revolution of tuning switch 24 the tuning switch is geared to make half a turn for each full turn of member 32.

As the position of the loops and nodes in the standing wave pattern is purely a function of the distance in wavelengths to the reflecting end wall, a physical recession of the wall by an amount exactly equal to the movement of the aperture toward the wall would cause an energy loop centered on the aperture at the start of the aperture movement to remain centered on it throughout its movement. In terms of electrical wavelength between aperture and reflecting wall, this is the effect of the terminating phase shifter 22. It in effect moves the reflecting wall selected by tuning switch 24 backwardly by the same amount and at the same rate that the aperture moves forwardly. If the impedance match at the aperture with respect to transmitted energy were perfect, the phase shifter 21 between the aperture and the transceiver 15 would not be required. But in practice it is difficult to establish such a degree of impedance match at the aperture as would prevent energy reflection at this point, and therefore the phase shifter 21 is used to preserve the same apparent line impedance at the transceiver 15.

The effect upon the directive lobe or scanning beam of the movement of the aperture from one end to the other of the primary antenna and the switching of the effective aperture from one to the other of the linear slots is diagrammatically indicated in Figs. 1, 10 and 11 of the drawing. The angular displacement of the scanning beam in azimuth by the longitudinal movement of the aperture is indicated at 93 in Fig. 1, and the angular displacement of the beam by switching from the aperture associated with one linear slot to the aperture associated with the other slot is indicated at 94 in Fig. 10. The result in the embodiment of the invention illustrated is to cause the directive beam to scan in azimuth or bearing and to lobe-switch in elevation.

The cross-sectional dimensions of the directive beam at the half-power point, as has been stated, are a function of wavelength, reflector dimensions, and focal length of the reflector. The scanning sweep and the lobe switching displacement of the directive beam depend upon the position and movement of the primary antenna aperture in relation to the reflector or secondary antenna principal focus. The local plane of the secondary antenna or reflector includes the principal focus and is transverse to the antenna axis. The successive linear movements of the primary antenna aperture are horizontally approximately centered on the antenna axis and occur along lines alternately above and below the principal focus. The extent of the lobe switching displacement of the aperture above and below the focus in alternate traverses and the beam dimensions are such that there is an intersecting or overlapping relation in space between the areas scanned by the beam in its two lobe switching positions. This intersecting or overlapping relation is schematically shown in Fig. 11 of the drawing, the contour of the beam pattern being approximately as it would be near the full-power point.

It is evident that if the reflecting object lies well outside the effectively overlapping regions indicated in Fig. 11, it will receive and reflect energy only during the upper or lower scanning sweep within which it lies. If the reflecting object lies within the effective intersecting or overlapping region, it will receive and reflect energy during both scanning sweeps of the lobe-switched beam, and the number and strength of the received and reflected pulses for each beam will depend upon the angular extent of intersection of each of the two overlapping beams with the object. If the object lies at the mean horizontal line intersetcion 97 of the two beams, it will receive and reflect an equal number of pulses for each of the two lobe-switched scans, and these pulses will be of correspondingly increasing and diminishing strength. If the object lies either above or below this horizontal line intersection, there will be an inequality in the number and strength of pulses due to the action of each beam. For instance, if the direction of the object with respect to the mean scanning axis of the two beams is such as to lie in line 96 of the overlap, the number of the energy pulses reflected by way of the upper beam will be considerably greater in number and strength than the pulses reflected by way of the lower beam, and, assuming that the bias of the vertical sweep circuit of the cathode ray tube 40 (see Fig. 7) is such as to cause the screen pattern of the upper beam to lie above the screen pattern of the lower beam, the indication produced on the screen 61 of the tube will be as indicated at 96'. If the direction of the reflecting object with respect to the two beams is such as to lie in line 98 of Fig. 11, an indication like that of 98' will be produced on the screen 61; while if the direction of the object is such as to lie on line 97 of Fig. 11, coinciding with the antenna axis, the indication produced on the screen will be like that represented at 97' of Fig. 7.

It follows that in an antenna system such as disclosed herein, arranged to scan in azimuth and lobe-switch in elevation, the pattern of the indication produced on the screen of the oscilloscope or cathode ray tube furnishes information as to whether the object producing the indication is above or below or in alignment with the axis of the scanning antenna. Guided by the information thus presented, the antenna elevation may be increased if the indication is like that of 96' or may be decreased if the indication is like that of 98' until the two closely spaced lines on the screen are equal in length as in indication 97'. When this equality is obtained, the position of the object is known, range being indicated by the vertical position of the indication on the screen, azimuth by the horizontal position, and elevation by the angle at which the antenna is trained when the two spaced lines of the indication are equal in length. Obviously, when the two lines of an indication lying at any azimuthal angle are equalized by training the antenna properly in elevation, the antenna may be swung in azimuth to cause the equalized lines to coincide with the zero azimuth line of the screen, as in indication 97', at which time the antenna is trained on the object in azimuth and elevation, and range may be read on the counter that controls the vertical position on the screen of the range lines 100.

In the description of operation of the radar system that follows, particular reference will be made in Fig. 12 of the drawing. This is a functional schematic diagram the lower portion of which shows the operative electrical and mechanical relationships that exist between various elements of the system. The upper portion of Fig. 12, related to the lower portion by the vertical broken line, shows schematically the direction and extent of movement in azimuth of the antenna beam as effected by the movement of the feed apertures 30 and 31 along the parallel longitudinal slots of the primary antenna member 23, and also the displacement of the antenna lobe in elevation by the lobe-switching operation that tunes one or the other of the parallel longitudinal slots and its associated aperture. For convenience in description one of the primary antenna slots and its associated feed aperture and the scanning movement and position of the resultant antenna beam is designated A, and the other primary antenna slot, associated aperture and scanning movement and position of the resultant antenna beam is designated B.

The focus of the paraboloidal reflector is indicated at 37. The schematic representation of the primary antenna member 23 with its associated elements and also the position and direction of movement in space of the scanning lobes are as these parts would appear looking from the reflector, toward the area being scanned. Each of the A and B movements of the feed apertures is represented as being from right to left past the focus 37, and therefore both of the resultant movements of the scanning beams A and B, after reflection, are from left to right. As the start and finish of the apertures in the A and B movements are dissymmetrical with respect to the antenna axis passing through the focus 37, the start and finish of the A and B lobe-scanning movements of the antenna beam are similarly dissymmetrical with respect to the antenna axis. Assuming the specific illustrative structure already described, the A scanning movement of the beam in azimuth is from −10 degrees to +8½ degrees, with 0 degree representing the antenna axis, and the B scanning movement of the beam is from −8½ degrees to +10 degrees. Also, since the A movement of the aperture is along a line above the focus 37 and the B movement of the aperture is along a line below the focus 37, the corresponding positions of the scanning beams are inverted in space, the B path of the beam being above and the A path below the horizontal plane of the antenna axis.

The elements associated with the primary antenna member 23 are indicated merely schematically. These are the front phase shifter 21, the rear phase shifter 22, the tuning switch 24, and the mechanism including the motor 25, reduction gearing 47, and the drive shaft 38 for operating the antenna switch unit 48, the primary antenna member 23, and the phase shifters and tuning switch. The circular oppositely directed arrows 43, as has been stated, indicate the presence of means for rotating the antenna assembly as a whole in azimuth, and the circular oppositely directed arrows 44 represent the presence of means for rotating in elevation the portion of the antenna assembly including the primary antenna member 23 and the associated paraboloid reflector.

The transceiver, schematically illustrated in the lower portion of Fig. 12 and including the elements shown within the broken-line-delimited space designated 15, comprises in part a conventional transmitter-receiver 39 connected to transmission line or wave guide 16 for supplying to and receiving from the primary antenna pulsed centimetric waves, an oscilloscope or cathode ray tube indicator 40, and an adjustable liquid delay 41 of the type disclosed in Patent 2,407,294 granted on September 10, 1946, to W. Shockley and G. W. Willard, the delay device 41 being connected by the reference pulse lead 42 to the transmitter in device 39. Oscilloscope 40 is connected to the receiver in device 39 by the received echo pulse lead 45 and to delay device 41 through the branch reference pulse lead 46. The adjustment of delay circuit 41 may be made manually by means of handle 49 associated with shaft 50 and gears 51. A counter 52 is mounted on the shaft 50 for ascertaining the range in yards. The oscilloscope or cathode ray tube indicator 40 comprises the cathode 53, grid 54, focussing anode 55, accelerating electrode 56, vertical sweep plates 57 and 58, horizontal sweep plates 59 and 60, and a rectangular screen 61. The plates 58 and 60 are connected alternatively to ground 62 or to potentiometer devices 63 and 64, respectively, depending upon the state of deenergization or energization of relay 65.

Reference numeral 66 denotes a saw-tooth generator controlled over lead 67 by the transmitter in device 39 and connected by the lead 68 to tube 40 for producing a vertical sweep on the screen 61 of oscilloscope 40. Reference numeral 69 denotes another saw-tooth generator connected by lead 70 for obtaining a horizontal sweep for the oscilloscope indication.

The timing circuit for the horizontal sweep generator 69 is controlled from the antenna switch unit 48. The controlling mechanism includes an insulator disc 71 mounted on the auxiliary shaft 73 and containing a conductive radial arm member 72, the shaft being driven through a one-to-one gear assembly 74 by the drive shaft 38 which has a one-to-one turns ratio with the rotation of the helically slotted member of the primary antenna. At one instant during each revolution of the auxiliary shaft 73 and drive shaft 38, leads 75 and 76 of the control circuit are short-circuited through stationary contact 77 and arm 72, whereby the sweep produced by saw-tooth generator 69 is synchronized with the travel of the primary antenna aperture and the corresponding sweep of the scanning antenna lobe.

The operating circuit of the biasing relay 65 for the oscilloscope sweep circuits is also controlled from the antenna switch unit 48. The controlling mechanism for the circuit of relay 65 includes a disc 78, one-half of which is conducting and the other half of insulating material, and a stationary contact member 79. The disc 78 is mounted on the auxiliary shaft 80, which is driven through the gear assembly 81 by the drive shaft 38, the gear ratio being such that the auxiliary shaft 80 makes one complete turn for two complete turns of the drive shaft 38. The conducting half of disc 78 and the contact member 79 are so related as to engage and thus energize relay 65 during one complete turn of drive shaft 38, and to disengage and deenergize relay 65 during the next succeeding complete turn of drive shaft 38, whereby the origins of successive sweep deflections of the oscilloscope or cathode ray tube, both vertical and horizontal, are alternately shifted in synchronism with the operation of primary antenna tuning switch 24.

Referring to Figs. 7 and 12, when the tube 40 is energized, a fine cathode ray beam is caused to be projected on screen 61. The saw-tooth generator 69 connected between the horizontal sweep plates 59 and 60 causes the cathode beam to commence its sweep horizontally across screen 61. Timing of the cathode ray sweep is controlled by the rotating arm 72 in a manner such that the cathode beam is synchronized with the sweep of the antenna directive lobe across the 18½-degree azimuthal scanning sector. One sweep of the cathode ray beam occurs for each revolution of drive shaft 38 and each traverse of apertures 30 and 31 from one end to the other of their associated slots. Simultaneously, the saw-tooth generator 66 connected between the vertical sweep plates 57 and 58 causes the beam to sweep vertically, the sweep being timed or controlled over lead 67 by the pulses generated in the transmitter portion of device 39. Hence, coincidentally with the emission of each pulse, the cathode beam starts to move vertically upwards, the time interval for the complete up-and-down excursion of the beam being equal to the time interval between pulses. The down sweep is preferably blanked out.

The echo or received pulse is supplied over echo lead 45 to the grid 54 and causes a momentary increase in the intensity of the moving cathode beam. Thus, a single echo pulse appears on the screen 61 as a dot 101, Fig. 7, and the successively received pulses reflected by an object appear as a luminous horizontal line having a length in degrees on the screen approximately equal to the breadth in degrees of the effective intersected portion of the scanning lobe, and having a brightness that is maximum at its center and diminishes toward its ends. The line is composed of closely associated dots each representing an echo pulse and each having its locus on a separate up trace of the beam. As the pulsing rate has been assumed to be 1,800 pulses per second, and the cathode beam may be assumed in the present embodiment to sweep horizontally 10 times per second in synchronism with the rapidly scanning antenna lobe, there are 180 vertical sweeps or traces for each scanning frame corresponding to an 18½-degree territorial sector, and therefore approximately 10 dots for each degree of effective intersection of the scanning lobe.

Simultaneously, with the delivery of each pulse by device 39 to line 16, a reference pulse is supplied over lead 42 to the delay device 41 and thence over branch reference lead 46 to grid 55 of tube 40, whereby at a point in each upsweep of the cathode beam, the beam intensity is slightly increased and a range measuring line 100, Fig. 7, is produced. The horizontal luminous range line 100 is movable under control of handle 49 and its position may be accurately determined from counter 52. If, referring to Fig. 7, reference numerals 96', 97' and 98' denote pulse indications representing reflective objects, the range or distance of each object, and the difference in their ranges, may be accurately determined by manipulating handle 49 and moving line 100. The azimuthal angle of the reflective objects may be approximately determined by observation of their position in relation to the azimuthal angle lines 102 on screen 61. For more accurate determination of the direction of the object, the antenna may be rotated, as indicated by the arrows 43, for the purpose of shifting the scanning zone until the 0-angle line 102 coincides with the center point of the horizontal line representation of the object.

The function performed by the biasing operation in properly placing the object indications on screen 61 of tube 40 may be more readily understood by reference to the upper portion of Fig. 12 showing the scanning lobes, their paths of movement in space, and the extent of intersect with each lobe of objects arbitrarily assumed to lie at —5 degrees, 0 degree and +5 degrees and at different positions in elevation. On account of the linear displacement of primary antenna apertures 30 and 31 in relation to each other the azimuthal sweep paths A and B of the scanning lobes in space are correspondingly displaced. As the apertures 30 and 31 are relatively displaced linearly in the guide one-quarter wavelength or about one and one-half inches, and as there is approximately one degree movement of the scanning lobe in space per inch of aperture movement, the scanning path B in space is displaced about one and one-half degrees to the right in relation to scanning path A. In order that the indications on screen 61 produced by the two scanning paths shall occupy their proper positions in azimuth, it is necessary to bias the origin of the horizontal B sweeps on the screen so that there shall be a corresponding one and one-half degrees on the screen to the right of the origin of the A sweeps.

As represented on Fig. 12, the detuning pin 90 of tuning switch 24 has just moved into position where aperture 31 is detuned and aperture 30 is tuned and operative. In this position the energizing circuit of biasing relay 65 is open at contacts 78 and 79 of antenna switch 48. Consequently, relay 65 is inert and the horizontal and vertical sweep circuits of tube 40 are unbiased while scanning sweep A takes place. At the instant sweep A is completed, detuning pin 90 detunes aperture 30, leaving aperture 31 tuned, contacts 78 and 79 of antenna switch 48 closed, and relay 65 operates to apply a bias to the origins of the horizontal and vertical sweep circuits of tube 40. This bias is such that during the B movement of the lobe-switched scanning beam the horizontal sweep of the cathode-ray beam across screen 61 of tube 40 is displaced to the right to correspond to to displacement of B relative to A in space, and the vertical sweep of the cathode-ray beam is displaced upwardly so that the indication produced by the B scan lies above the indication produced by the A scan on the screen of tube 40. The amounts of these displacements may be adjusted to the degree desired by the potentiometers 63 and 64, the adjustment being such that the two indications corresponding to each object are centered horizontally with respect to each other, and are displaced vertically so that their magnitudes may readily be compared as to length and brightness.

The horizontal lines of elevational intersect 96, 97 and 98 of the two lobes are represented in Fig. 12, together with the relative amounts $96^2$, $97^2$ and $98^2$ of intersection with each lobe of objects assumed to lie at —5 degrees, 0 degree and +5 degrees that produce the double line signal indications 96', 97' and 98' shown in Fig. 7. Also two other elevational intersect lines 95 and 99 assumed to be relatively widely separated, say by several degrees in elevation, from lines 96, 97 and 98 are shown in Fig. 12. Line 95 effectively intersects only the upper lobe and produces a single series of reflection pulses $95^2$ to produce a single line indication on the screen, and line 99 effectively intersects only the lower lobe and produces a single series of reflection pulses $99^2$ to produce a single line indication on the screen.

The relative vertical positions of the lines $95^2$, $96^2$, $97^2$, $98^2$ and $99^2$ in Fig. 12 represent only the position of the objects in elevation with respect to the position of the two lobes of the lobe-switched scanning beam, and do not represent range, which is indicated by the vertical positions of the resultant indications on the screen 61, as shown in Fig. 7. As the bias of the origins of the vertical sweeps of the cathode ray beam that produces the double-line object indications also affects the delayed pulses that produce the range line 100, the range line consists of two lines spaced apart by the same amount as that of the double lines of the object indications.

What is claimed is:

1. In combination, a parabolic reflector, a wave guide having a pair of apertures facing said reflector, and means for moving said apertures at a constant speed along parallel lines in a plane perpendicular to the reflector axis and including the reflector focus, the paths of movement of said apertures being approximately centered on said axis and lying on opposite sides of said focus.

2. In combination, a passive secondary antenna having a principal focus, a wave guide having two apertures each constituting a primary antenna facing said secondary antenna, means for moving said apertures unidirectionally, repeatedly and at a uniform speed in parallel paths lying on opposite sides of the focus of said secondary antenna, and means for alternately energizing said apertures in successive movements thereof.

3. In combination, a parabolic reflector, a wave guide having a pair of apertures facing said reflector and longitudinally spaced along the direction of wave propagation in said guide, each of said apertures constituting a primary antenna, means for moving said apertures along said wave guide across the axis and in the focal plane of said reflector along parallel lines spaced equally from said axis and on opposite sides thereof, a source of centimetric electrical waves connected with one end of said wave guide, wave reflecting terminations connected with the other end of said wave guide and correspondingly longitudinally spaced relative to the direction of wave propagation in said guide, each reflecting termination being so related to a corresponding one of said apertures as to make said aperture operative to transmit and receive waves and the other aperture inoperative, means for maintaining an unvarying electrical distance between each termination and its corresponding aperture during the movement of said apertures, and switching means for making said reflecting terminations and their corresponding apertures successively and alternately operative.

4. In combination, a parabolic reflector, a wave guide having two apertures facing said reflector, spaced along the wave transmission path in said guide, and each constituting a primary antenna, said apertures lying on opposite sides of and equally spaced from the latus rectum of said reflector, two reflecting walls at one end of said guide and correspondingly spaced along the wave transmission path, each of said reflecting walls being so related with a corresponding one of said apertures as to make that aperture operative to transmit and receive waves and the other aperture inoperative to transmit and receive waves, and switching means for making said apertures successively and alternately operative to transmit and receive waves.

5. In combination, a parabolic reflector, a wave guide having two apertures each constituting a primary antenna facing said reflector, said apertures lying at different linear distances approximating a quarter wavelength apart along said wave guide and disposed on opposite sides of the latus rectum of said reflector and equally spaced therefrom, two reflecting walls at one end of said wave guide, the spacing of said reflecting walls along the direction of wave transmission being the same as the linear spacing of said apertures, and switching means for alternately and successively making said apertures operative to transmit and receive waves and the other reflecting wall and its aperture inoperative.

6. In combination, a parabolic reflector, a wave guide having two apertures each constituting a primary antenna facing said reflector, said apertures lying at different linear distances approximating a quarter wavelength apart along said wave guide, means for moving said apertures simultaneously along parallel lines lying in the focal plane of said reflector and on opposite sides of the reflector axis, two reflecting walls at one end of said wave guide and having the same linear spacing as said apertures, means for maintaining an unvarying electrical distance between each wall and its correspondingly spaced aperture during the aperture movement, and means for electrically connecting said walls with said wave guide alternately and successively.

7. In combination, a parabolic reflector, a wave guide having two parallel linear slots facing said reflector, a rotatable element coaxially located within said wave guide and having a single helical slot, the pitch at the helical slot and the spacing of the two parallel slots being such as to form two apertures longitudinally spaced apart a quarter of a wavelength along the guide, and means for rotating said element to cause said apertures to move repeatedly and in the same direction along the guide.

References Cited in the file of this patent

UNITED STATES PATENTS

| Number | Name | Date |
|---|---|---|
| 2,075,808 | Fliess | Apr. 6, 1937 |
| 2,083,242 | Runge | June 8, 1937 |
| 2,412,867 | Briggs et al. | Dec. 17, 1946 |
| 2,416,088 | Deerhake | Feb. 18, 1947 |
| 2,416,591 | Muntz et al. | Feb. 25, 1947 |
| 2,418,124 | Kandoian | Apr. 1, 1947 |
| 2,418,143 | Stodola | Apr. 1, 1947 |
| 2,419,556 | Feldman | Apr. 29, 1947 |
| 2,419,567 | Labin | Apr. 29, 1947 |
| 2,426,189 | Espenschied | Aug. 26, 1947 |
| 2,434,253 | Beck | Jan. 13, 1948 |
| 2,435,988 | Varian | Feb. 17, 1948 |
| 2,436,380 | Cutler | Feb. 24, 1948 |
| 2,438,735 | Alexanderson | Mar. 30, 1948 |